US007405293B1

(12) United States Patent
Barresi et al.

(10) Patent No.: US 7,405,293 B1
(45) Date of Patent: *Jul. 29, 2008

(54) REDUCED MALTO-OLIGOSACCHARIDES

(75) Inventors: Frank W. Barresi, Coralville, IA (US);
Richard L. Antrim, Solon, IA (US)

(73) Assignee: Grain Processing Corporation,
Muscatine, IA (US)

( * ) Notice: Subject to any disclaimer, the term of this patent is extended or adjusted under 35 U.S.C. 154(b) by 687 days.

This patent is subject to a terminal disclaimer.

(21) Appl. No.: 10/653,037

(22) Filed: Aug. 29, 2003

Related U.S. Application Data

(63) Continuation of application No. 09/366,065, filed on Aug. 2, 1999, now Pat. No. 6,613,898, which is a continuation of application No. PCT/US99/10198, filed on Jan. 19, 1999.

(60) Provisional application No. 60/071,905, filed on Jan. 20, 1998.

(51) Int. Cl.
C08B 30/12 (2006.01)
(52) U.S. Cl. ...................... 536/103; 536/124
(58) Field of Classification Search ................ 536/124, 536/123.1, 102, 103; 127/36; 426/313
See application file for complete search history.

(56) References Cited

U.S. PATENT DOCUMENTS

| | | | |
|---|---|---|---|
| 2,280,975 A | 2/1942 | Power | |
| 3,639,389 A | 2/1972 | Hull | |
| 3,876,794 A | 4/1975 | Rennhard | |
| 3,890,300 A | 6/1975 | Huchette | |
| 3,935,284 A | 1/1976 | Kruse | |
| 3,963,788 A | 6/1976 | Kruse | |
| 4,248,895 A | 2/1981 | Stroz | |
| 4,248,945 A | 2/1981 | Alvarez | |
| 4,279,931 A | 7/1981 | Verwaerde | |
| 4,322,569 A * | 3/1982 | Chao et al. ................ 568/863 |
| 4,336,152 A | 6/1982 | Like | |
| 4,346,116 A | 8/1982 | Verwaerde | |
| 4,445,938 A | 5/1984 | Verwaerde | |
| 4,463,116 A | 7/1984 | Koyama | |
| 4,655,125 A * | 4/1987 | Ishida et al. ................ 99/355 |
| 4,675,293 A | 6/1987 | Gibs | |
| 4,677,177 A * | 6/1987 | Shibanai et al. ............ 527/300 |
| 4,680,180 A | 7/1987 | Bussiere | |
| 4,717,765 A | 1/1988 | Hirao | |
| 4,728,510 A | 3/1988 | Shibanai | |
| 4,845,208 A | 7/1989 | Fuertes | |
| 4,985,553 A | 1/1991 | Fuertes | |
| 5,034,231 A | 7/1991 | Yatka | |
| 5,098,893 A | 3/1992 | Franks | |
| 5,109,128 A | 4/1992 | Schumacher | |
| 5,266,467 A * | 11/1993 | Inglett ..................... 435/99 |
| 5,290,765 A | 3/1994 | Wettlaufer | |
| 5,348,737 A | 9/1994 | Syed | |
| 5,478,593 A | 12/1995 | Serpelloni | |
| 5,493,014 A | 2/1996 | Caboche | |
| 5,506,353 A | 4/1996 | Subramaniam | |
| 5,520,840 A | 5/1996 | Massaro | |
| 5,523,108 A | 6/1996 | Wansor | |
| 5,571,547 A | 11/1996 | Serpelloni | |
| 5,601,836 A | 2/1997 | Parker | |
| 5,601,863 A * | 2/1997 | Borden et al. ............... 426/548 |
| 5,620,873 A | 4/1997 | Ohkuma | |
| 5,627,273 A | 5/1997 | Thomaides | |
| 5,629,042 A | 5/1997 | Serpelloni | |
| 5,641,477 A | 6/1997 | Syed | |
| 5,655,552 A | 8/1997 | Samain | |
| 5,656,584 A | 8/1997 | Angell | |
| 5,690,956 A | 11/1997 | Lau | |
| 5,720,978 A | 2/1998 | Morehouse | |
| 5,756,438 A | 5/1998 | Rau | |
| 5,772,013 A | 6/1998 | Kunz | |
| 5,780,620 A | 7/1998 | Mandai | |
| 5,795,852 A | 8/1998 | He | |
| 5,853,487 A | 12/1998 | Tang | |
| 5,866,533 A | 2/1999 | Beck | |
| 5,900,261 A | 5/1999 | Ribadeau-Dumas | |

(Continued)

FOREIGN PATENT DOCUMENTS

DE    19751630 A1    5/1999

(Continued)

OTHER PUBLICATIONS

STN abstract of JP 44-78898 (1969). Accessed Sep. 17, 2007.*

(Continued)

*Primary Examiner*—Leigh C Maier
(74) *Attorney, Agent, or Firm*—Banner & Witcoff, Ltd.

(57) ABSTRACT

Disclosed are a method for the reduction of an oligosaccharide mixture and an oligosaccharide mixture prepared thereby. In accordance with the disclosed invention, a mixture of oligosaccharides having a given DP profile is reduced to a DE of essentially zero by catalytically hydrogenating the mixture under reaction conditions sufficient to preserve the DP profile of the mixture, which reaction conditions typically include a reaction temperature ranging from about 50° C. to about 150° C. and a reaction pressure ranging up to about 1500 psi. Surprisingly, when the mixture is a malto-oligosaccharide mixture, the reduced mixture will have a superior color-fastness and thermal stability as compared to a similar unreduced mixture of malto-oligosaccharides, and also low reactivity towards nitrogen-containing species.

20 Claims, No Drawings

U.S. PATENT DOCUMENTS

| | | | |
|---|---|---|---|
| 5,955,448 | A | 9/1999 | Colaco |
| 5,965,501 | A | 10/1999 | Rattinger |
| 6,107,348 | A | 8/2000 | Nakano |
| 6,613,898 | B1 * | 9/2003 | Barresi et al. ............... 536/124 |

FOREIGN PATENT DOCUMENTS

| | | | |
|---|---|---|---|
| EP | 0142725 B1 | | 5/1985 |
| EP | 0171964 A2 | | 2/1986 |
| EP | 0548399 B1 | | 6/1993 |
| EP | 0618286 A1 | | 10/1994 |
| EP | 0670368 B1 | | 9/1995 |
| EP | 0577519 B1 | | 4/1996 |
| EP | 0727485 B1 | | 8/1996 |
| EP | 0775709 B1 | | 5/1997 |
| EP | 0791658 B1 | | 8/1997 |
| EP | 0839916 B1 | | 5/1998 |
| EP | 0816373 A1 | | 7/1998 |
| EP | 0854149 B1 | | 7/1998 |
| FR | 2668147 A1 | | 4/1992 |
| GB | 526839 | | 10/1940 |
| GB | 1169538 | | 11/1969 |
| JP | 44-18898 | * | 8/1969 |
| JP | 04148661 | | 5/1992 |
| JP | 05103586 | | 4/1993 |
| JP | 05294837 | | 11/1993 |
| JP | 10028531 | | 2/1998 |
| WO | 9214761 A1 | | 9/1992 |
| WO | 9218542 A1 | | 10/1992 |
| WO | 9507303 A1 | | 3/1995 |
| WO | 9611589 A1 | | 4/1996 |
| WO | 9729133 A1 | | 8/1997 |
| WO | 9734861 A1 | | 9/1997 |
| WO | 9842814 A1 | | 10/1998 |
| WO | 9842818 A1 | | 10/1998 |
| WO | 9856827 A1 | | 12/1998 |
| WO | 9911748 A1 | | 3/1999 |
| WO | 9936442 A1 | | 7/1999 |
| WO | 0032157 A1 | | 6/2000 |

OTHER PUBLICATIONS

Kennedy et al "Maltodextrins" Chapter 3, pp. 65-82 of "Handbook of Starch Hydrolysis Products and Their Derivatives" Springer (1995) Kearsley & Dziedzic ed.*

English translation of Matsuda et al (JP 44-018898) 1969.*

Arts et al., "Hydrogen Peroxide and Oxygen in Catalyctic Oxidation of Carbohydrates and Related Compounds," Synthesis, 597-613 (Jun. 1997).

Bell et al., "Glass Transition Explanation for the Effect of Polyhydroxy Compounds on Protein Denaturation in Dehydrated Solids," Journal of Food and Science, 61 (2), 372-374 (1996).

Bender, "Studies of the Inhibition by Malto-Oligosaccharides of the Cyclization Reaction Catalyzed by the Cyclodextrin Glycosyltransferase from Kiebsiella Pneumonic M 5al with Glycogen," Carbohydrate Research, 135 (2), 291-302 (Abstract) (1985).

Bendiak, "Nuclear Magnetic Resonance Spectroscopy of Peracetylated Oligosaccharides having C-labeled carbonyl Groups in lieu of Permethylation Analysis for Establishing Linkage Substitutions of Sugars," Carbohydrate Research, 315, 206-221 (1999).

Glattfeld et al., "The Caralyctic Dehydrogenation of Sugar Alcohols," Journal of the American Chemical Society, 60 (9), 2013-2023 (1938).

Heyns et al., "Selektive Katalystiche Oxydation mit Edeletall Katalysatoren," Angewandte Chem, 69 (13-14), 600-608 (Jul. 15, 1957), no translation.

Heyns et al., "Die Darstellung der L-Gulose," Katalytiche Oxydationen, 91 (13), 1720-1724 (1958), no translation.

Kusano et al., "Effects of Reduced Malto-Ogligosaccharides on the Thermal Stability of Pullulanase from Bacillus Acidopullulycticus," Carbohydrate Research, 199 (1), 83-89 (1990).

Handbook of Analytical Derivatzation Reactions, John Wiley & Sons, Inc., New York, New York, 582-584 (1979).

Kearsley et al. "Production and Physiochemical Properties of Hydrogenated Glucose syrups," Die Starke, 29 (12), 425-429 (1977).

Kearsley et al. "The Production and Properties of Glucose syrups, III. Sweetness of Flucose Syrups and Related Carbohydrates" Starch/Starke 32, 244-247 (1980).

Leroy, "Hydrogenated Starch Hydrolysates," Health and Sugar Substitutes, Proc. ERGOB Conference, Geneva, 114-119 (1978).

McNeil, "Elimination of Internal Glycosyl Residues During Chemical Ionization-Mass Spectrometry of Per-O-Alkylated Oligosaccharide-Alditols," Carbohydrate Research 123, 31-40 (1983).

Nakagawa et al., "Construction from a Single Parent of Baker's Yeast Strains with High Freeze Tolerance and Fermentive Activity in Both Lean and Sweet Doughs," Tokyo Research Laboratories, App. Environ. Microbiol., 60 (10), 3499-3502 (1994).

O'Brien, "Stability of Trehalose, Sucrose and Glucose to Nonenzymatic Browning in Model Systems," Journal of Food Science, 61 (4), 679-682 (1996).

Rodriguez de Sotillo et al., "Potato Peel Waste: Stability and Antioxidant Activity of a Freeze-Dried Extract," Journal of Food Science, 59 (5), 1031-1033 (1994).

Roper, "Selective Oxidation of D-Glucose: Chiral Intermediates for Industrial Utilization," Carbohydrates as Organic Raw Materials, 268-288 (1991).

Rossie et al., "Stabilization of the Restriction Enzyme EcoRI Dried with Trehalose and Other Selected Glass Forming Solutes," Biotechnol. Prog., 13 (5), 609-616 (1997).

Schebor et al., "Glassy State and Thermal Inactivation of Invertase and Lactase in Dried Amorphous Matrices," Biotechnology Process, 13 (6), 857-863 (Abstract) (1997).

* cited by examiner

REDUCED MALTO-OLIGOSACCHARIDES

RELATED APPLICATION

The present application claims priority to prior U.S. Provisional Application Ser. No. 60/071,905, filed Jan. 20, 1998, the entire contents of which are hereby incorporated by reference.

TECHNICAL FIELD OF THE INVENTION

The present invention relates generally to reduced malto-oligosaccharide species and methods for the preparation thereof.

BACKGROUND OF THE INVENTION

Oligosaccharides are commonly prepared by the controlled hydrolytic cleavage of starches. In the production of such oligosaccharides, the glycosidic linkages of the starch molecules are partially hydrolyzed to yield at least one oligosaccharide species, and more typically, a mixture of oligosaccharide species. Each oligosaccharide species in the mixture may be characterized by its degree of polymerization (DP), which refers to the number of saccharide monomer units in the molecule. Each oligosaccharide species also may be characterized by its dextrose equivalent (DE), which generally indicates the proportion of aldehyde, hemiacetal or ketone terminal groups in the molecule, and which is a measure of the reducing sugar content of the oligosaccharide, expressed as a percentage of the total dry substance. The DE value and DP profile for a given oligosaccharide mixture can vary substantially, depending, for example, upon the type of starch precursor used to obtain the mixture and the conditions employed for hydrolysis of the base starch.

Oligosaccharide mixtures prepared by the hydrolytic cleavage of starch typically include at least one malto-oligosaccharide species. Malto-oligosaccharides are characterized as having a saccharide backbone that comprises predominantly 1-4 glycoside linkages. Malto-oligosaccharides having a DE less than 20 are known as maltodextrins, whereas malto-oligosaccharides having a DE of 20 or greater are known as syrup solids.

It is known in the art to reduce malto-oligosaccharides and other starch hydrolyzates by reducing is the terminal groups in the malto-oligosaccharide or starch hydrolyzate molecule. Such reduced malto-oligosaccharides and other starch hydrolyzates are useful in a variety of applications, including, for example, sweetening agents and texturing agents in products intended for ingestion by animals or humans. Examples of such products include sweets, chewing gums, syrups, food additives, pharmaceutical agents, and so forth. Typically, starch hydrolyzates have been reduced via enzymatic, catalytic, or chemical methods. For example, U.S. Pat. No. 2,280, 975 describes a process for the production of polyhydric alcohols via catalytic reduction of mono- and disaccharides. A more recent patent, U.S. Pat. No. 4,322,569, discloses the reduction of monosaccharides by contacting the monosaccharide with hydrogen in the presence of a nickel catalyst in a catalytic bed.

Known processes for the reduction of and starch hydrolyzates suffer from a number of drawbacks. For example, it is often desired to reduce a malto-oligosaccharide to a DE of zero or essentially zero. Typically, such would be accomplished by substantially completely catalytically hydrogenating the malto-oligosaccharide until the desired DE value is obtained. When malto-oligosaccharides are reduced in accordance with such methods, however, the polysaccharide backbones of the individual species in the mixture may become cleaved, as reported, for example in the aforementioned U.S. Pat. No. 2,280,975 with regard to the reduction reaction disclosed therein. Such cleavage of the polysaccharide backbone will cause the DP of the cleaved species in the malto-oligosaccharide to become lower, and will cause an alteration in the overall DP profile of the malto-oligosaccharide mixture. Such alteration of DP profile may cause certain physical properties of the mixture, such as viscosity, to change, thus potentially requiring alteration of processes in which the mixture is intended for use.

Another problem in the art pertains to the color-fastness of malto-oligosaccharides. Malto-oligosaccharides are typically characterized by having a non-zero DE value. One problem with known malto-oligosaccharides is that solutions thereof may tend to yellow under certain conditions, for example, under conditions of heat, alkaline pH, or traces of nitrogen-containing compounds, thus causing visual degradation of the product in which the malto-oligosaccharide is incorporated or other undesired effects. This tendency towards color formations is indicative of the chemical reactivity of the malto-oligosaccharides under the foregoing conditions, particularly towards nitrogen compounds.

In light of these shortcomings in the art, there exists a need for a method for reducing a malto-oligosaccharide to a DE of essentially zero without altering substantially the DP of the malto-oligosaccharide, and particularly for reducing a mixture of malto-oligosaccharides to a DE of essentially zero without altering substantially the DP profile of the mixture. A further need in the art exists for a malto-oligosaccharide product having an improved resistance to color formation. The general objects of the present invention are to provide a method and a product that overcome the foregoing drawbacks of the prior art.

THE INVENTION

The foregoing general objects have been achieved by the present invention, which provides a method for the catalytic reduction of an oligosaccharide, and which further provides a reduced oligosaccharide prepared thereby. In accordance with the invention, a method for substantially reducing a mixture of a plurality of oligosaccharide species is provided. The oligosaccharide species may differ at least in DP value, thus defining a DP profile for the mixture. In the preferred embodiment of the invention, the method comprises the steps of providing the oligosaccharide mixture, and catalytically hydrogenating the mixture under hydrogenation conditions suitable to substantially preserve the DP profile of the mixture. Surprisingly, it has been found that catalytic hydrogenation of oligosaccharides such as maltodextrins in the presence of a metal catalyst, such as platinum, palladium, ruthenium, rhodium, or nickel, at temperatures ranging from about 50° C. to about 150° C. and pressures ranging up to about 1500 psi will be effective in substantially reducing the DE of the mixture to zero or essentially zero, without substantially altering the DP profile of the mixture. In another embodiment of the invention, the method comprises catalytically reducing an oligosaccharide or mixture of oligosaccharides at a pH ranging from about 3.5 to about 8.5. In either embodiment, the invention is more generally contemplated to be useful in connection with the catalytic reduction of polysaccharides.

In accordance with a preferred embodiment of the invention, a mixture of reduced malto-oligosaccharide species is catalytically reduced. The species differ in at least DP value thus defining a DP profile for the mixture. Surprisingly, it has been found that, when a starting malto-oligosaccharide mixture is catalytically hydrogenated in accordance with the invention, the reduced malto-oligosaccharide mixture thus formed will have a DP profile that is not substantially altered as compared with the DP profile of the starting malto-oligosaccharide mixture. It has further surprisingly been found that the resistance to color formation of the reduced malto-oligosaccharide, as measured by the light absorbance thereof, is improved relative to the starting mixture of unreduced malto-oligosaccharides. A liquid mixture of the reduced malto-oligosaccharides will be stable, and, it is believed, relatively more stable than a liquid mixture of unreduced malto-oligosaccharides.

Further features and objects of the invention will be apparent from the following description and appended claims.

DESCRIPTION OF THE PREFERRED EMBODIMENTS

The method of the invention is applicable to any oligosaccharide species or mixture of a plurality of oligosaccharide species, and more generally to polysaccharide species and mixtures thereof. By "polysaccharide" and "oligosaccharide" are is contemplated any species comprised of plural saccharide units, whether linked by 1-4 linkages, 1-6 linkages, or otherwise. For example, the invention is applicable in the reduction of malto-oligosaccharides and mixtures thereof, as well as other oligosaccharides. By "malto-oligosaccharides" is contemplated any species comprising two or more saccharide units linked predominately via 1-4 linkages, and including maltodextrins and syrup solids. In preferred embodiments, in the reduced malto-oligosaccharides of the invention, at least 50 percent of the saccharide units in the malto-oligosaccharide are linked via 1-4 linkages. More preferably, at least about 60 percent of the saccharide units are linked via 1-4 linkages; even more preferably, at least about 80 percent of the saccharide units are so linked. The malto-oligosaccharides may include saccharide species having an odd DP value, and the profile may be partially defined by a saccharide species having a DP value of 1, for example, dextrose or sorbitol. The mixture further may include other saccharide species or other components.

While the invention finds applicability with respect to any malto-oligosaccharide mixture, the invention is particularly applicable to malto-oligosaccharide species in which at least a portion of the malto-oligosaccharides in the mixture have a DP value greater than 5. Preferably, at least one of the malto-oligosaccharide species in the mixture has a DP value of 8 or more. More preferably, at least one species has a DP value of at least 10. For example, in preferred embodiments of the invention, at least 80 percent of the malto-oligosaccharide species in the mixture have a DP greater than 5, and at least 60 percent may have a DP greater than 8. In another embodiment, at least 80 percent of the malto-oligosaccharides species have a DP greater than 10. In some embodiments of the invention, the DP profile of the starting mixture is such that at least 75 percent of the malto-oligosaccharides species in the mixture have a DP greater than 5 and at least 40 percent of the species in the mixture have a DP greater than 10. Such starting materials may be obtained conventionally, for example, by the partial hydrolysis of starch.

Suitable malto-oligosaccharides are sold as maltodextrins under the trademark MALTRIN® by Grain Processing Corporation of Muscatine, Iowa. The MALTRIN® maltodextrins are malto-oligosaccharide products, each product having a known typical DP profile. Suitable MALTRIN® maltodextrins that may be reduced in accordance with the present invention include, for example, MALTRIN® M040, MALTRIN® M050, MALTRIN® M100, MALTRIN® M150, and MALTRIN® M180. Typical approximate DP profiles of the subject MALTRIN® maltodextrins are set forth in the following table (the DP profiles being approximate as indicated in the table):

| DP profile | M180 | | M150 | | M100 | | M050 | | M040 | |
|---|---|---|---|---|---|---|---|---|---|---|
| DP > 8 | 46.6 | ±4% | 54.7 | ±4% | 67.8 | ±4% | 90.6 | ±4% | 88.5 | ±4% |
| DP 8 | 3.9 | ±2% | 4.8 | ±1.5% | 4.5 | ±1.5% | 1.5 | ±1% | 2.0 | ±1% |
| DP 7 | 9.5 | ±2% | 9.1 | ±1.5% | 7.0 | ±1.5% | 1.5 | ±1% | 2.4 | ±1% |
| DP 6 | 11.4 | ±2% | 8.4 | ±1.5% | 6.1 | ±1.5% | 1.4 | ±1% | 1.8 | ±1% |
| DP 5 | 5.9 | ±2% | 4.7 | ±1.5% | 3.3 | ±1.5% | 1.3 | ±1% | 1.3 | ±1% |
| DP 4 | 6.4 | ±2% | 5.5 | ±1.5% | 3.7 | ±1.5% | 1.1 | ±1% | 1.4 | ±1% |
| DP 3 | 8.3 | ±2% | 6.7 | ±1.5% | 4.2 | ±1.5% | 1.0 | ±1% | 1.4 | ±1% |
| DP 2 | 6.2 | ±2% | 4.8 | ±1% | 2.5 | ±1% | 0.8* | ±1% | 0.9* | ±1% |
| DP 1 | 1.8 | ±1.5% | 1.3 | ±1% | 0.7* | ±1% | 0.8* | ±1% | 0.3* | ±1% |

*MINIMUM VALUE = 0%

The invention encompasses reduced maltodextrins having substantially the foregoing approximate DP profiles, however made. Other suitable malto-oligosaccharides include other maltodextrins, such as MALTRIN® M440, MALTRIN® 4510, MALTRIN® M550; MALTRIN® M580, an MALTRIN® M700, as well as corn syrup solids such as MALTRIN® M200 and MALTRIN® M250 (these having a DE>25). The invention is not limited to malto-oligosaccharides species, and indeed, any suitable polysaccharide may be employed as a starting material in conjunction with the present invention.

In accordance with the invention, the starting material comprising the polysaccharide or mixture of polysaccharides is substantially reduced, in some cases to a DE of essentially zero, under conditions suitable to substantially preserve the DP profile of the starting materials. By "substantially reduced" is meant that the DE of the reduced polyosaccharide is reduced by at least about 85%, and preferably at least about 90%, relative to the initial DE of the polysaccharide starting materials. The term "essentially zero" as used herein with respect to DE value refers to a hydrogenated product having a DE of less than about 1. By "substantially preserved" as used herein with respect to DP profile is meant that, in the reduced product, the oligosaccharide percentage of at least a majority of the polysaccharide species having a given DP value does not differ by more than about 7%, preferably no more than about 4%, more preferably no more than about 2%, and most preferably no more than about 0.75%, based on 100% of the polysaccharide species and relative to the corresponding species of like DP value in the starting material prior to reduction.

The hydrogenation of the polysaccharide may be accomplished in any suitable manner. For example, in one embodiment of the invention, the hydrogenation is accomplished chemically, using sodium borohydride or another hydride donor. Preferably, however, the hydrogenation is accomplished catalytically, in the presence of a metal catalyst suitable for catalyzing the hydrogenation of the polysaccharide in the presence of hydrogen. Examples of suitable hydrogenation catalysts include palladium, platinum, ruthenium, rhodium, and nickel. The metal catalyst may be in the form of the neutral metal, or may be in the form of suitable metal alloy, oxide, salt, or organometallic species. Preferably, the catalyst is nickel or an activated nickel species, (such as a molybdenum promoted nickel species). Examples of suitable commercially available catalysts include A-7063 (Activated Metals and Chemicals, Inc.); H-07 (Engelhard); Raney™ 3110, 3111, and 3201 (Davison Chemical); and BK113W (Degussa), with the most preferred catalyst being Raneym 3110. The catalyst may be employed in any amount effective to catalyze hydrogenation of the polysaccharide species, and preferably is present in an amount ranging from about 0.5 to about 10% (w/w polysaccharide) in the reaction mixture.

The hydrogenation of the malto-oligosaccharide or other polysaccharide is accomplished under pressures and temperatures suitable to maintain the DP profile thereof. The reaction pressure preferably ranges up to about 1500 psi. More preferably, the pressure ranges from about 200 psi to about 1200 psi; even more preferably the pressure ranges from about 400 psi to about 700 psi. The reaction temperature preferably ranges from about 50 to about 150° C.; more preferably, the temperature ranges from about 100° C. to about 130° C.; even more preferably, the temperature ranges from about 110° C. to about 120° C. Hydrogen optionally may be introduced into the reaction vessel at any rate effective to reduce the polysaccharide. Preferably, the vessel is filled with hydrogen, and additional hydrogen is added a purge rate of up to about 2.5 L/min for a 2.0 L reaction vessel.

The reaction may take place in any medium suitable to effectuate the hydrogenation of the saccharide mixture. Preferably, the reaction takes place in an aqueous medium, under pH conditions suitable for the hydrogenation reaction to proceed. The pH of the medium preferably ranges from about 3.5 to about 8.5, more preferably from about 4.5 to about 6.5, and even more preferably from about 5 to about 6. The invention is generally contemplated in some embodiments to comprise the step of catalytically reducing a polysaccharide mixture in aqueous solution at the specified pH ranges. For example, the invention encompasses a method comprising the steps of providing an oligosaccharide or oligosaccharide mixture, such as a malto-oligosaccharide mixture, and catalytically hydrogenating the mixture in aqueous solution at a pH ranging from about 3.5 to about 8.5.

To ensure adequate hydrogenation under these temperatures and pressures, the reaction mixture should be vigorously agitated. Hydrogenation should proceed for a time sufficient for the DE value of the polysaccharide mixture to be reduced to essentially zero. In preferred embodiments of the invention, the reaction time ranges from about 0.5 hours to about 72 hours, more preferably, from about 1 hour to about 8 hours, even more preferably, about 2 to about 4 hours.

The reaction may be performed in a catalytic bed containing the metal catalyst. In accordance with this embodiment of the invention, the polysaccharide and hydrogen are continuously introduced into the reaction bed under conditions sufficient to reduce the DE of the polysaccharide to a value of essentially zero while maintaining the DP profile. The temperature and pressure conditions in the catalytic bed may be substantially as hereinbefore described.

Surprisingly, it has been found that reduced malto-oligosaccharides prepared in accordance with the present invention have low light absorbance values. For example, in preferred embodiments of the invention, the absorbance of the reduced malto-oligosaccharide is less than about 0.25; more preferably, the absorbance is less than about 0.15, after holding a solution of the malto-oligosaccharide at 75° C. and pH 10 for two hours. As used herein, the absorbance refers to the absorbance at 450 nm of a 10% solution of the malto-oligosaccharide, as measured in a 1 cm cell. In contrast, the UV absorbance of MALTRIN® M100, a product which has a DE of about 10, is about 0.73 after being treated under the same conditions. The surprisingly low light absorbance of the reduced malto-oligosaccharides of the present invention after stressing under the aforementioned reaction conditions indicates an enhanced resistance to color formation.

The reduced malto-oligosaccharides and other polysaccharides prepared in accordance with the process of the invention may be used in most or all applications in which a non-reduced polysaccharide was previously used. With respect to at least malto-oligosaccharides, examples of such applications include film-forming agents; bulking agents, carrying agents for dry products or capsules; fillers for products such as creams and lotions; binders for roller compaction/granulation applications; medical and nutritional agents; soaps and cleansers; spray-drying agents; tableting agents; crystallization inhibitors; sweetness controllers; cryoprotectants; and so forth. The reduced malto-oligosaccharides of the invention are believed to be substantially unreactive toward proteinaceous species, thus potentially leading to enhanced properties in related applications. Of course, the invention is not limited in applicability to the foregoing specific applications, and the process and product of the invention may find utility in other applications as well.

For example, the reduced malto-oligosaccharides may be used in a method for freezing a biological sample, the biological sample being a cell, tissue, protein, DNA, or other sample. It is known in the art to lyophilize such samples by forming an aqueous solution of the sample, and then to remove water from the solution. Maltodextrins are commonly used as cryoprotectants to protect the sample against damage caused by ice crystallization during lyophilization. One problem with the use of conventional maltodextrins as cryoprotectants is that the reactivity of malto-oligosaccharides causes unwanted reactions, such as glycosylation or cross-linking of proteins. The reduced malto-oligosaccharides of the present invention may be employed in a method that includes the steps of providing a biological sample in an aqueous solution, adding to the sample a reduced malto-oligosaccharide to form a combination, and lyophilizing the combination. The reduced malto-oligosaccharide preferably is a mixture of malto-oligosaccharides prepared in accordance with the foregoing teachings. It has surprisingly been found that the reduced malto-oligosaccharides prepared in accordance with the invention function well as cryoprotectants, and the reduced reactivity protects against reaction with proteins and other nitrogen-containing species.

The following examples illustrate preferred embodiments of the invention, but should not be construed as limiting in scope.

EXAMPLE 1

Reduction of Maltodextrin

In 650 ml of deionized water was dissolved 567 g of MALTRIN® M100 maltodextrin (5.6% moisture). Sodium borohydride, 28.5 ml (12% solution, 14M NaOH) was slowly added to the stirred mixture at ambient temperature. The initial pH of the solution was measured and found to be pH 11.8.

The mixture was stirred overnight (17.5 hrs.) and quenched by adjusting the pH with 7% HCl solution to a pH of 7.3. The sample was then frozen and freeze-dried to yield 573 g of product, the product including 2% moisture and 5.37% ash.

A 393 g sample of product was prepared by purifying the product by passing the product through two series of alternating columns of DOWEX™ MONO 88 strong cationic exchange resin in the hydrogen form, and of DOWEX™ MONO 66 weak anionic exchange resin in the free base form. The DP profile was then determined.

The following results were obtained:

| DP | Approximate DP profile of MALTRIN® M100 (as measured via HPLC analysis) (% dry solid basis) | DP profile of Reduced Maltodextin Mixture (% dry solid basis) |
| --- | --- | --- |
| DP > 8 | 67.3% | 67.0% |
| DP 8 | 4.6% | 4.6% |
| DP 7 | 6.9% | 7.1% |
| DP 6 | 5.9% | 6.0% |
| DP 5 | 3.1% | 3.4% |
| DP 4 | 3.8% | 3.8% |
| DP 3 | 4.4% | 4.5% |
| DP 2 | 2.8% | 2.7% |
| DP 1 | 1.0% | 0.2% |

The DE value of the MALTRIN® M100 starting material was 11.8. In contrast, the DE value of the reduced maltodextrin mixture was 0.8.

Thus, it is seen that the DE of the maltodextrin mixture was reduced to a DE of essentially zero, while the DP profile was substantially preserved.

EXAMPLE 2

Catalytic Maltodextrin Reduction

To 450 ml water was added 265 g MALTRIN® M100 maltodextrin (5.5% moisture). The mixture was stirred for 30 minutes at room temperature to obtain a clear solution. To the solution was added 22.4 g of a 50% slurry of activated nickel (Acros) in water (9% w/w catalyst/maltodextrin). This solution was stirred for another 10 minutes, and the pH was measured as pH 8.5.

The mixture was transferred to a 2.0 L Parr 4522M reactor. The reactor was sealed and stirring was commenced at 550 rpm. Subsequently, the reactor was pressurized to 1150 psi with hydrogen gas and heated to 115° C. to initiate hydrogenation of the maltodextrin. After five hours, the reaction was stopped by cooling, and the vessel was then depressurized.

The reaction contents were filtered through Whatman No. 1 filter paper to give a clear viscous solution having a pH of 6.85 and 33% solids. About 250 g of material having an ash content of about 0.16% was recovered. The sample was combined with products from replicate hydrogenation runs, ion exchanged as in Example 1, and freeze dried.

This experiment was repeated ten times with selected pressure, temperature, and stirring ranges, and the following results were obtained.

| | | | | | | | | | | |
| --- | --- | --- | --- | --- | --- | --- | --- | --- | --- | --- |
| psi | 1000 | 1150 | 1000 | 1000 | 1000 | 1300 | 1300 | 1300 | 1000 | 1300 |
| Temp (° C.) | 100 | 115 | 130 | 100 | 130 | 130 | 100 | 100 | 130 | 130 |
| Rpm | 600 | 500 | 600 | 400 | 600 | 400 | 600 | 400 | 400 | 600 |

| DP PROFILE | CONTROL | TRIAL 1 | TRIAL 2 | TRIAL 3 | TRIAL 4 | TRIAL 5 | TRIAL 6 | TRIAL 7 | TRIAL 8 | TRIAL 9 | TRIAL 10 |
| --- | --- | --- | --- | --- | --- | --- | --- | --- | --- | --- | --- |
| DP > 8 | 67.3 | 65.0 | 66.1 | 65.6 | 66.6 | 66.0 | 64.6 | 66.7 | 66.4 | 65.5 | 65.9 |
| DP 8 | 4.6 | 4.4 | 4.7 | 4.7 | 4.6 | 4.6 | 4.7 | 4.6 | 4.6 | 4.7 | 4.6 |
| DP 7 | 6.9 | 7.2 | 7.4 | 7.4 | 7.4 | 7.4 | 7.3 | 7.4 | 7.3 | 7.4 | 7.2 |
| DP 6 | 5.9 | 6.3 | 6.4 | 6.5 | 6.4 | 6.4 | 6.5 | 6.4 | 6.4 | 6.5 | 6.4 |
| DP 5 | 3.1 | 4.2 | 3.4 | 3.4 | 3.4 | 3.4 | 3.5 | 3.3 | 3.3 | 3.5 | 3.3 |
| DP 4 | 3.8 | 4.1 | 3.8 | 3.8 | 3.8 | 3.8 | 3.9 | 3.8 | 3.8 | 3.9 | 3.8 |
| DP 3 | 4.4 | 4.2 | 4.5 | 4.5 | 4.4 | 4.5 | 4.5 | 4.4 | 4.5 | 4.5 | 4.4 |
| DP 2 | 2.8 | 2.7 | 2.8 | 2.8 | 2.7 | 2.8 | 2.8 | 2.7 | 2.7 | 2.8 | 2.8 |
| DP 1 | 1.0 | 0.8 | 1.0 | 1.4 | 0.8 | 1.0 | 2.2 | 0.8 | 0.8 | 1.5 | 1.5 |
| DE | 11.8 | 0.6 | <0.5 | <0.5 | 0.98 | <0.5 | 0.3 | 0.6 | 0.8 | <0.5 | 0.4 |

The best results were obtained when hydrogenation pressure was between 1000 and 1300 psi, temperature was between 100°-130° C., and impeller speed was >500 rpm. It is further contemplated that as the hydrogen purge rate and agitation are increased, lower reaction temperatures and pressures are realizable thereby.

As demonstrated, the DP profile of the starting material was substantially preserved upon reduction in each case, while the DE was reduced to a value of essentially zero.

EXAMPLE 3

Catalytic Maltodextrin Reduction

MALTRIN® M180 maltodextrin, 519 g (5.5% moisture) was added to 881 ml water and stirred for approximately 30 minutes to obtain a clear solution. Raney™ nickel GD3110 (Grace Davison), 18.4 g (3.7% dry solids basis catalyst/maltodextrin w/w) was added and the mixture was stirred for another 10 minutes at room temperature. The entire mixture (ca. 35% solids) was then transferred to a 2.0 L Parr 4522 M reactor. The unit was sealed and stirring was continued at 600 rpm. The Parr reactor was pressurized to 500 psi with hydrogen gas and heated to 120° C. After 4 hours at 120° C., the reaction was stopped by cooling and then depressurization. The reaction contents were filtered through Whatman No. 1 filter paper to give a clear viscous solution. The sample was then ion exchanged as set forth in Example 1. No detectable ash was found after ion exchange. The sample was freeze dried after ion exchange to yield a maltodextrin mixture having a DE of 0.46, an ash content of 0%, and the following DP profile.

| DP | DP profile (% dry solids basis) |
|---|---|
| DP > 8 | 46.2% |
| DP 8 | 4.0% |
| DP 7 | 9.4% |
| DP 6 | 11.1% |
| DP 5 | 5.9% |
| DP 4 | 6.4% |
| DP 3 | 8.5% |
| DP 2 | 6.4% |
| DP 1 | 2.0% |
| DE | 0.46 |

EXAMPLE 4

Absorbance Evaluation

Samples of MALTRIN® M100 maltodextrin, ion-exchanged MALTRIN® M100 maltodextrin, and reduced MALTRIN® M100 maltodextrin (from Example 1) were held at 75° C. for two hours in solution at a pH of about 10. The absorbance of a 10% solution of each sample was thereby obtained using a 1 cm cell.

| SAMPLE | ABSORBANCE (10%/1 cm) |
|---|---|
| MALTRIN ® M100 | 0.74 |
| Reduced MALTRIN ® M100 | 0.07 |

As shown, the 450 nm absorbance of reduced MALTRIN® M100 maltodextrin is significantly lower as compared to non-reduced MALTRIN® maltodextrins, thus indicating a lower reactivity. It is believed that the decrease in absorbance is largely due to the reduction of the maltodextrin in accordance with the invention.

EXAMPLE 5

Catalyst Evaluation

This example comparatively evaluates a number of activated nickel catalysts.

To 900 ml water was added 600 g MALTRIN® M180 maltodextrin (5% moisture). The mixture was stirred for 30 minutes at room temperature to ensure dissolution, then is poured into a 2.0 L Parr 4522M reactor. Activated sponge nickel was added to the reactor (3.7% w/w catalyst/maltodextrin), after which the reactor was sealed and stirred at 600 rpm.

The reactor was pressurized to 1000 psi and heated to 110° C. Hydrogen was introduced into the reaction at a rate of about 0.5 L/min. A sample of the reaction mixture was taken after 2 hours, and the reaction was stopped after four hours and a final sample taken. The experiment was repeated several times.

The samples were filtered, ion-exchanged, and freeze-dried as before, and then evaluated for DE and DP profile. DE was evaluated over a number of runs for each sample.

| | Average DE | |
|---|---|---|
| Catalyst | Avg. DE (2 hr) | Avg. DE (4 hr) |
| AM&C A-7063 | 1.93 | 0.86 |
| Raney ™ GD 3110 | 1.75 | 0.77 |
| Raney ™ GD 3111 | 3.44 | 1.14 |
| Raney ™ GD 3201 | 6.17 | 3.32 |
| Engelhard H-102 | 2.13 | 0.82 |
| Degussa BK 113W | 2.93 | 0.91 |
| Acros (generic) | — | 2.08 (5.4 hrs) |

As shown in the foregoing table, most of the listed catalysts were satisfactory. It was found that pressure could be decreased to as low as about 600 psi with a concomitant temperature to about 130° C. and an increase in purge rate to about 2 L/min.

The DP profile was evaluated after four hours reaction time under various conditions (impeller speed was 600 rpm in each case). The following results were observed for several of the runs.

| | DP Profile (% dry solids basis) | | | | | | |
|---|---|---|---|---|---|---|---|
| Catalyst | Raney | Engelhard | AM & C | Raney | Degussa | Degussa | Raney |
| | GD3110 | H-107 | A-7063 | GD3110 | BK 113W | BK 113W | GD3110 |
| Pressure (psi) | 1000 | 1000 | 1000 | 750 | 1000 | 1000 | 600 |
| Temp (° C.) | 110 | 110 | 110 | 130 | 110 | 110 | 130 |
| MALTRIN ® M180 control | 1 | 2 | 3 | 4 | 5 | 6 | 7 |
| DP > 8 | 44.8 | 44.6 | 45.3 | 44.0 | 44.0 | 44.40 | 44.3 | 44.4 |
| DP 8 | 3.9 | 3.9 | 3.9 | 4.0 | 4.0 | 4.0 | 3.8 | 3.9 |
| DP 7 | 10.0 | 10.0 | 10.0 | 10.0 | 9.8 | 9.9 | 9.8 | 9.9 |
| DP 6 | 12.0 | 11.9 | 12.0 | 11.9 | 11.7 | 11.8 | 11.7 | 11.8 |
| DP 5 | 5.8 | 6.1 | 5.9 | 6.1 | 6.2 | 6.1 | 6.1 | 6.2 |
| DP 4 | 6.5 | 6.6 | 6.4 | 6.6 | 6.6 | 6.6 | 6.6 | 6.6 |

| | | Catalyst | | | | | | |
|---|---|---|---|---|---|---|---|---|
| | | Raney GD3110 | Engelhard H-107 | AM & C A-7063 | Raney GD3110 | Degussa BK 113W | Degussa BK 113W | Raney GD3110 |
| DP 3 | 8.5 | 8.7 | 8.5 | 8.8 | 8.8 | 8.9 | 8.9 | 8.8 |
| DP 2 | 6.5 | 6.4 | 6.3 | 6.8 | 6.7 | 6.7 | 6.7 | 6.6 |
| DP 1 | 1.9 | 1.7 | 1.7 | 1.6 | 1.8 | 1.7 | 1.8 | 1.8 |
| DE | ~18 | 1.23 | 1.46 | 0.219 | 0.087 | 0.409 | 1.315 | 0.095 |
| % solids | | 32.15 | 32.35 | 33.3 | 32.95 | 32.25 | 32.75 | 33.8 |

As shown, the DP profile of the starting malto-oligosaccharide mixture was substantially preserved, while the DE was reduced to essentially zero or was substantially reduced in each case.

EXAMPLE 6

MALTRIN® M040 maltodextrin was catalytically hydrogenated in the same manner as in Example 3. Samples of reduced malto-oligosaccharide were obtained thereby in two separate runs. The DP profile and DE value for each run was evaluated, and the following results were obtained:

| | DP Profile (% dry solids basis) | | |
|---|---|---|---|
| | MALTRIN® M040 Control | Run 3 | Run 2 |
| DP > 8 | 92.9 | 91.7 | 89.8 |
| DP 8 | 0.7 | 0.7 | 0.9 |
| DP 7 | 1.1 | 1.2 | 1.7 |
| DP 6 | 1.1 | 1.3 | 1.7 |
| DP 5 | 0.8 | 1.0 | 1.2 |
| DP 4 | 1.1 | 1.2 | 1.4 |
| DP 3 | 1.2 | 1.4 | 1.6 |
| DP 2 | 0.7 | 0.8 | 1.1 |
| DP 1 | 0.3 | 0.4 | 0.4 |
| DE | ~5 | 0.502 | 0.62 |

These results illustrate that, for each run, the DP profile was substantially preserved, while the DE value was reduced to a value of substantially zero.

EXAMPLE 7

Temperature Stability

This example illustrates the improved temperature stability of the reduced malto-oligosaccharide of the invention.

Samples of MALTRIN® M180, M100 and M040 were comparatively evaluated against hydrogenated samples of M180, M100, and M040 using a TLA 2050 Thermogravimetric Analyzer (TA Instruments Inc., New Castle, Del.). To the analyzer pan was added 5.000-8.000 mg of the sample (in separate test runs). Each sample was heated from 25° C. to 600° C. at 10° C./min in oxygen (purge rate of 100 cm$^3$/min). The onset of weight change of the sample was taken as the onset of thermal degradation. The following results were obtained.

| Sample | Onset of Degradation Temperature (° C.) | Temperature Stability Increase (Δ° C.) |
|---|---|---|
| M180 | 263.2 | |
| Hydrogenated M180 | 286.2 | 23.0 |
| M100 | 270.4 | |
| Hydrogenated M100 | 292.2 | 21.8 |
| M040 | 270.2 | |
| Hydrogenated M040 | 288.1 | 17.9 |

These results demonstrate that the reduced malto-oligosaccharides of the invention have an improved thermal stability as compared with their non-reduced counterparts.

While particular embodiments of the invention have been shown, it will be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention. All references cited herein are hereby incorporated by reference in their entireties.

What is claimed is:

1. A method for reducing a mixture of a plurality of malto-oligosaccharide species to a dextrose equivalent (DE) of less than about 1, each of said malto-oligosaccharide species having a non zero DE resulting from the presence of a reducing end group on said malto-oligosaccharide species, said plurality of malto-oligosaccharide species differing at least in degree of polymerization (DP) value thus defining a DP profile for said mixture, said plurality of malto-oligosaccharides comprising a maltodextrin, said method comprising the steps of:
   providing said malto-oligosaccharide mixture; and
   catalytically hydrogenating said mixture under hydrogenation condition suitable to substantially preserve the DP 1-8 profile of said mixture.

2. Method according to claim 1, said method including a step of hydrogenating said mixture in the presence of a metal hydrogenation catalyst.

3. Method according to claim 2, said catalyst being a metal catalyst selected from the group consisting of platinum, palladium, ruthenium; rhodium, and activated nickel.

4. Method according to claim 3, said catalyst being activated nickel.

5. Method according to claim 4, said catalytic hydrogenation being performed at a temperature ranging from about 50 degrees C. to about 150 degrees C. and a pressure ranging up to about 1500 psi.

6. Method according to claim 5, said catalytic hydrogenation being performed at a temperature ranging from about 100 degrees C. to about 130 degrees C. and a pressure ranging up to about 1500 psi.

7. Method according to claim 6, said pressure ranging from about 200 psi to about 1500 psi.

8. Method according to claim 6, said temperature ranging from about 110 degrees C. to about 120 degrees C. and said pressure ranging from about 400 psi to about 700 psi.

9. Method according to claim 8, wherein said pH ranges from about 4.5 to about 6.5.

10. Process for the reduction of a malto-oligosaccharide mixture, the process comprising the step of:
    providing a catalytic bed including a hydrogenation catalyst;
    providing a malto-oligosaccharide mixture including a plurality of malto-oligosaccharide species, each of said malto-oligosaccharide species having a non zero DE resulting from the presence of a reducing end group on said malto-oligosaccharide species, said plurality of malto-oligosaccharide species differing in at least in DP value thus defining a DP profile for said mixture, said mixture of malto-oligosaccharide comprising a maltodextrin; and
    continuously introducing said malto-oligosaccharide mixture and hydrogen to said catalytic bed under hydrogenation conditions sufficient to catalytically hydrogenate said mixture to reduce the DE thereof to less than about 1, said conditions being suitable to substantially preserve the DP 1-8 profile of said mixture.

11. Process according to claim 10, said catalyst being a metal catalyst selected from the group consisting of platinum, palladium, ruthenium, rhodium, and activated nickel.

12. Process according to claim 11, said metal catalyst being activated nickel.

13. Process according to claim 12, said catalytic hydrogenation being performed at a temperature ranging from about 100 degrees C. to about 130 degrees C. and a pressure ranging up to about 1500 psi.

14. Process according to claim 13, said pressure ranging from about 200 psi to about 1500 psi.

15. Process according to claim 13, said pressure ranging from about 400 psi to about 700 psi and said temperature ranging from about 110 degrees C. to about 120 degrees C.

16. Process according to claim 10, wherein said malto-oligosaccharide mixture is reduced in said catalytic bed at a pH ranging from 3.5 to about 8.5.

17. Process according to claim 16, wherein said pH ranges from about 4.5 to about 6.5.

18. Method for preparing a reduced malto-oligosaccharide, comprising the steps of:
    providing a starch;
    hydrolyzing said starch to provide a mixture of a plurality of malto-oligosaccharide species, each of said malto-oligosaccharide species having a non zero DE resulting from the presence of a reducing end group on said malto-oligosaccharide species, said plurality of malto-oligosaccharide species differing at least in degree of polymerization (DP) value thus defining a DP profile for said mixture, said mixture of malto-oligosaccharides comprising a maltodextrin; and
    catalytically hydrogenating said malto-oligosaccharide species under hydrogenation conditions suitable to substantially preserve the DP 1-8 profile of said mixture and to reduce the DE of said mixture to less than about 1.

19. Method according to claim 18, wherein said malto-oligosaccharide mixture is catalytically hydrogenated at a pH ranging from about 3.5 to about 8.5.

20. Method according to claim 19 wherein said pH ranges from about 4.5 to about 6.5.

* * * * *